United States Patent

Landeweer et al.

(10) Patent No.: US 6,716,901 B2
(45) Date of Patent: Apr. 6, 2004

(54) COMPOSITION FOR DISPERSING POLYMERS

(76) Inventors: Kim Norman Landeweer, 2111 HN, Aerdenhout (NL); Hans Joop Fischer, 7161 MH, Neede (NL)

( * ) Notice: Subject to any disclaimer, the term of this patent is extended or adjusted under 35 U.S.C. 154(b) by 0 days.

(21) Appl. No.: 09/855,436

(22) Filed: May 15, 2001

(65) Prior Publication Data

US 2002/0082325 A1 Jun. 27, 2002

(51) Int. Cl.[7] .................................................. C08K 5/16
(52) U.S. Cl. ...................................................... 524/186
(58) Field of Search ......................................... 524/186

(56) References Cited

U.S. PATENT DOCUMENTS

| | | | | | |
|---|---|---|---|---|---|
| 3,950,296 A | * | 4/1976 | Kangas | ....................... | 260/29.6 |
| 4,857,585 A | * | 8/1989 | Leising | ....................... | 524/815 |
| 5,095,058 A | * | 3/1992 | Smith | ....................... | 524/238 |
| 5,314,823 A | * | 5/1994 | Nakagawa | ................... | 435/264 |
| 5,328,690 A | * | 7/1994 | Sikes | .......................... | 424/401 |
| 5,449,715 A | * | 9/1995 | Plochocka | .................. | 524/556 |
| 5,708,071 A | * | 1/1998 | Takeda | ....................... | 524/458 |
| 5,817,609 A | * | 10/1998 | He et al. | ..................... | 510/133 |
| 5,925,722 A | * | 7/1999 | Exner et al. | ................ | 527/300 |
| 6,071,565 A | * | 6/2000 | Chiao | ......................... | 427/386 |
| 6,165,545 A | * | 12/2000 | Moody | ....................... | 427/140 |

* cited by examiner

*Primary Examiner*—Edward J. Cain
(74) *Attorney, Agent, or Firm*—McDonnell Boehnen Hulbert & Berghoff

(57) ABSTRACT

Described is a composition which is suitable for removing adhering substances, such as (synthetic) resins, paint lacquers, polymer foams and mastics by means of forming a dispersion. The composition comprises at least one amphoteric compound and optionally a surfactant substance.

There are also provided for the first time polymers or mixtures of polymers which are at least practically free of organic solvents and a method for producing these, i.e. by separation from the above stated dispersion.

2 Claims, No Drawings

COMPOSITION FOR DISPERSING POLYMERS

The present invention relates to the dispersion of polymers or polymer-containing mixtures such as resins, paint lacquers, polymer foams, fats and mastics to form a dispersion and to a method for removing such adhering polymer compounds. The present invention also provides a polymer such as a synthetic resin or a polymer-containing mixture at least practically free of organic solvents which can be recovered from the above stated dispersion.

Resins are understood to mean both natural resins and synthetic resins such as raw materials for paint compounds, for instance alkyd resins, glues, for instance on the basis of epoxy compounds, printing ink and the like.

Compositions for removing resins usually contain solvents which are harmful to the environment such as acetone, halogenated hydrocarbons, toluene and benzene. Terpentine is often used to remove paint products on alkyd resin basis.

All of these means are however to a greater or lesser extent harmful to the environment and for this reason should be prohibited. Applicant has recently described an environmentally-friendly alternative in the International Patent Application WO 00/49095. Described herein is the application of a composition consisting of at least one glucoside, a glycol compound and a sodium compound for removing adhering substances such as (synthetic) resins, paint lacquers, polymer foams and mastics.

It has now been found, unexpectedly, that a simpler composition, generally consisting of two components, i.e. as agent an amphoteric compound and optionally a surfactant substance, is also very suitable for dispersing polymers or polymer-containing mixtures in water. The advantage relative to the already known composition is that the present composition provides the same or a better cleaning action, while being simpler and cheaper to produce. The composition is moreover very readily biodegradable in water, which provides significant advantages from an ecological and commercial viewpoint. The composition is particularly environmentally-friendly as such without this having to detract from the cleaning qualities thereof.

The amphoteric compound preferably contains a minimum of one nitrogen group and one carboxyl group. Amphoteric compounds suitable for the composition according to the present invention are for instance EDTA (disodium ethylenediamine tetraacetate) or NTA (trisodium nitrilotriacetate). In addition, simple amino acids such as glycine, leucine, glutamic acid or lysine are also suitable as components of the composition according to the invention. The optimal activity of the composition occurs within a pH range which is determined by the component or components of the composition, the polymer for dispersal and the temperature at which operation takes place. The optimum generally lies above pH 7. In the case the amphoteric compound contains an overmeasure of nitrogen groups, as with lysine, the optimum can also lie in the acid range. The optimum pH can be adjusted in a manner known to the skilled person with a lye such as caustic soda or an acid such as hydrochloric acid, or with a buffered system.

For the dispersal of some polymers or polymer-containing mixtures in water the dissolving of a composition consisting of an amphoteric compound in water at a pH value as described above is sufficient. In some cases however, a surfactant substance such as for instance sodium dodecylbenzene sulphonate or the environmentally-friendly glucosides are necessary for a good action of the composition. Although numerous glucosides can in principle be used, wherein there is a significant preference for $C_6$–$C_{10}$ alkyl polyglucosides, in a preferred embodiment of the composition according to the invention the glucoside, if present, comprises octylpolyglucoside.

Compositions according to the present invention preferably consist for 60–100% of an amphoteric compound and for the rest of a surfactant compound (40–0%), with the exception of possible additives. The composition according to the present invention is preferably in concentrated form. The stated percentages relate to the composition in concentrated form. A particularly advantageous composition according to the present invention is designated RST-5™, consisting of about 60% NTA and about 40% octylpolyglucoside.

When applied as cleaning agent the composition must be dissolved in water in a ratio of about 1:10 to 20, for instance 1:15, depending on the cloud-point of the formed solution (the cloud-point is a concentration of polymer in water such that the solution is clear; at greater dilution the solution becomes clouded). The advantage of providing the composition in concentrated form is that the composition can be supplied in a relatively small volume, which results in considerable advantages, for instance in respect of transport.

Whether a surfactant substance is necessary to obtain a good cleaning effect depends on the type of polymer which has to be dispersed; the heavier and tougher the polymer-containing mixture, the higher the percentage of surfactant substance required. It is surmised that the amphoteric compound serves to "lift" (detach) the adhering contaminating polymer particles, while the surfactant substance, by "wrapping", prevents the detached particles once again forming a whole. Factors such as the extent to which other forms of energy such as heat are supplied (the higher the temperature, the better the result) and mechanical energy in the form of for instance water pressure, shaking, striking and brushing will of course also play a part here (the more movement is added, the quicker the dispersion process and the finer the formed dispersion). The dispersion of the composition according to the method of the invention is preferably applied at room temperature. Subject to the composition to be applied and the polymer for dispersing, it may be desirable to increase the temperature to for instance 25° C., 35° C. or even 45° C. or higher.

The method according to the invention is suitable for cleaning objects of many kinds. The object can thus comprise a paint-brush or roller from which paint residues have to be removed. The object may however also comprises a printing roller from which the printing ink has to be removed. The hands can also be cleaned in particularly effective manner using the composition and/or the method according to the invention. With a view hereto, a further embodiment of the composition according to the invention has the feature that it is provided in the form of a hand-soap.

A particular preferred embodiment has the feature herein that the composition comprises a peeling additive, and more particularly shell sand. Such an additive provides a mechanical removal in addition to the chemical action of the product. Shell sand is found to be an efficacious means of removing the most obstinate adhering substance from the hands in a short time.

According to another aspect of the present invention there is provided a polymer, such as for instance a synthetic resin, or polymer-containing mixture which is at least practically free of organic solvents. Such a polymer can be recovered in advantageous manner from the dispersion which can be formed in water from the composition according to the invention in a manner known to the skilled person.

To the dispersion is added for instance one or more hardeners such as methyl ethyl ketone peroxide (MEKP), dibenzoyl peroxide (DBP) or dicumyl peroxide (DCP) and, if necessary, one or more accelerators such as cobalt octate or aromatic alkylamines. The adding of a hardener and/or accelerator can also take place after the heavier polymer parts have settled out of the dispersion, whereafter the hardening process can still take place. The polymer mass practically free of organic solvents obtained in this manner can either be reused or destroyed or be reprocessed.

The importance of providing a polymer which is at least practically free of organic solvents is considerable. It is possible for the first time in environmentally-friendly manner to provide polymer resins such as for instance paint lacquers which are really environmentally-friendly. Being at least practically free of organic solvents is understood to mean a percentage by weight of organic solvents of less than 1%, preferably of less than 0.1%, in further preference of less than 0.01%.

The present invention will be further elucidated with reference to a number of examples. It will be apparent that the invention should by no means be interpreted as being limited to these examples.

EXAMPLE 1

The following compositions are added to polymers and mixtures thereof stated below:

polyester resins such as iso-resin (phthalic resin), ortho-resin (orthophthalic resin), vinyl resin, water-borne resin and bio-resin;

epoxy resins;

filler on the basis of polyester and on the basis of epoxy resin;

screen printing inks;

lacquer paints.
   a. A quantity of lukewarm water is brought using sodium hydroxide to a pH of about 9. Addition to the above stated resins creates hardly any dispersion.
   b. The flavour-enhancer vé-tsin, which contains glutamic acid, is added to the solution obtained under a. The pH of the solution falls to 5.5. Addition to the above stated resins creates hardly any dispersion.
   c. The pH of the solution obtained under b is brought using sodium hydroxide to a pH of about 9. Addition to the above stated resins creates a dispersion from which the polymers can be removed as inert solid mass or can be reprocessed practically free of organic solvents.

EXAMPLE 2

In the same manner as described in example 1, glycine or leucine is applied instead of vé-tsin. A comparable positive result is obtained.

EXAMPLE 3

In the same manner as described in example 1, EDTA or NTA is applied instead of vé-tsin, without sodium hydroxide having to be added. A comparable positive result is obtained.

What is claimed is:

1. Method for removing adhering polymers or polymer-containing mixtures, wherein a composition suitable for dispersing polymers or polymer-containing mixtures consisting essentially of an amphoteric compound and a surfactant, wherein the amphoteric compound is selected from the group consisting of disodium ethylenediamine tetraacetate, trisodium nitrolotriacetate, glycine, leucine, glutamic acid and lysine, is applied at a pH such that a dispersion is formed from which the adhering polymer is separated in solid form.

2. A method as claimed in claim 1 wherein the surfactant is alkyl polyglucoside or dodecylbenzene sulphonate.

* * * * *